United States Patent [19]
Sevier

[11] 3,807,957
[45] Apr. 30, 1974

[54] APPARATUS FOR CHEMICALLY SEPARATING OXYGEN FROM AIR

[75] Inventor: William J. Sevier, Spring Valley, Calif.

[73] Assignee: General Dynamics Corporation, San Diego, Calif.

[22] Filed: Nov. 24, 1965

[21] Appl. No.: 511,021

[52] U.S. Cl............... 23/252 R, 23/281, 55/353
[51] Int. Cl.............................................. B01j 7/00
[58] Field of Search............ 55/179, 182, 196, 290, 55/353, 400, 408, 404; 23/281, 252

[56] References Cited
UNITED STATES PATENTS

| | | | |
|---|---|---|---|
| 1,216,677 | 2/1917 | Feilmann | 55/290 |
| 2,134,544 | 10/1938 | Ashley | 55/196 |
| 2,302,807 | 11/1942 | Shoeld | 55/182 |
| 2,541,694 | 2/1951 | Galson | 55/179 |
| 2,639,000 | 5/1953 | Edwards | 55/179 |
| 2,758,015 | 8/1956 | Bovard | 23/281 |
| 2,850,113 | 9/1958 | Turner | 55/353 |
| 2,889,210 | 6/1959 | Bovard | 23/281 |
| 3,164,454 | 1/1965 | Wilson | 55/179 X |
| 3,212,239 | 10/1965 | Maestrelli | 55/400 X |
| 3,276,846 | 10/1966 | Modi et al. | 23/281 |

Primary Examiner—Benjamin R. Padgett
Assistant Examiner—R. L. Tate
Attorney, Agent, or Firm—John R. Duncan; Hugo F. Mohrlock

[57] ABSTRACT

A chemical separator for extracting oxygen from air having a ram air inlet opening into a venturi. High velocity, high temperature venturi air is ducted into the high pressure chambers of a plurality of radially disposed, peripherally driven, cylinders or drums rotated by air turbines. The cylinders are divided into high and low pressure chambers by a stationary panel fixed at its opposite ends to the frame of the separator. Cylinders are of double wall construction having a multiplicity of screened openings therein. Chemicals are contained between the cylinder walls for collecting and discharging oxygen as the chemicals are cycled between the high and low pressure chambers of the cylinders. Heat exchangers positioned in the low pressure chambers of the cylinders, cool the oxygen released by the chemicals to a liquid state for convenience in storage or direct ducting to a power plant.

8 Claims, 5 Drawing Figures

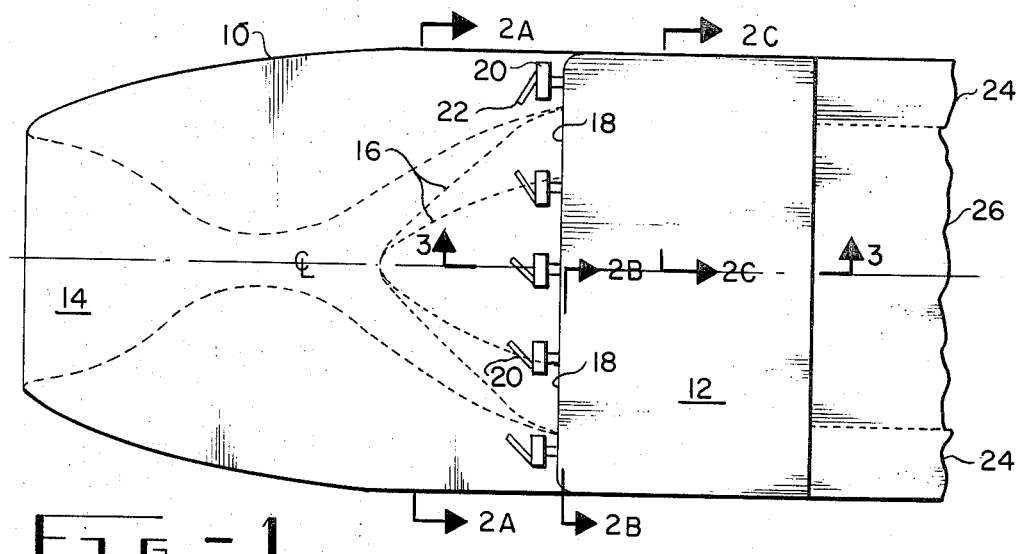
FIG - 1
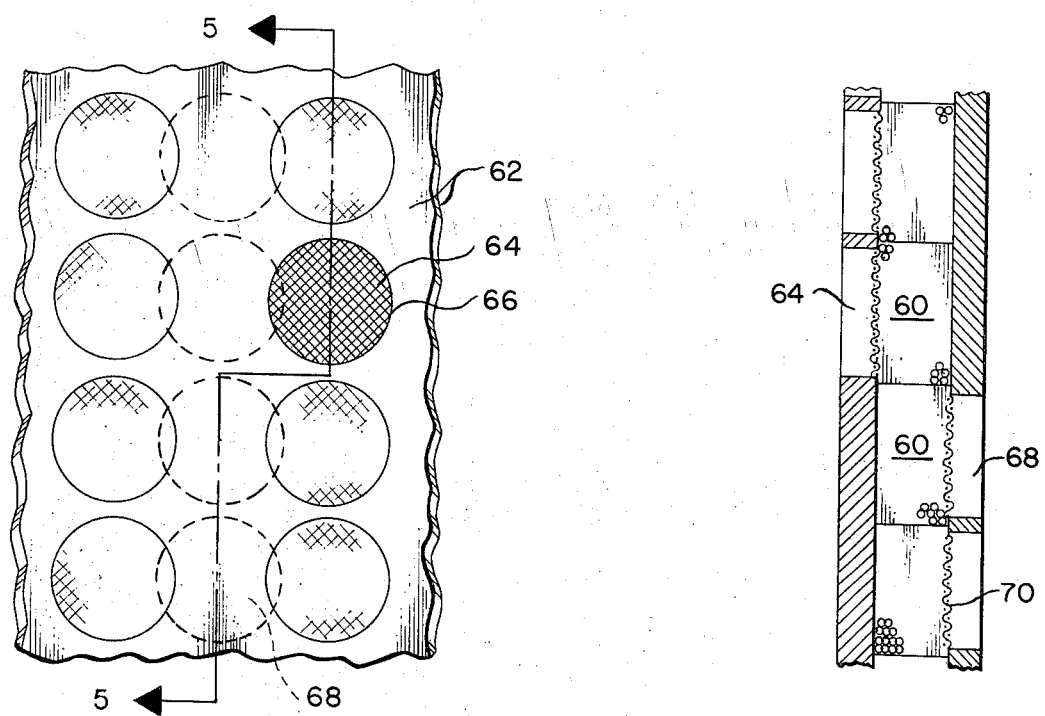
FIG - 4
FIG - 5
INVENTOR.
WILLIAM J. SEVIER

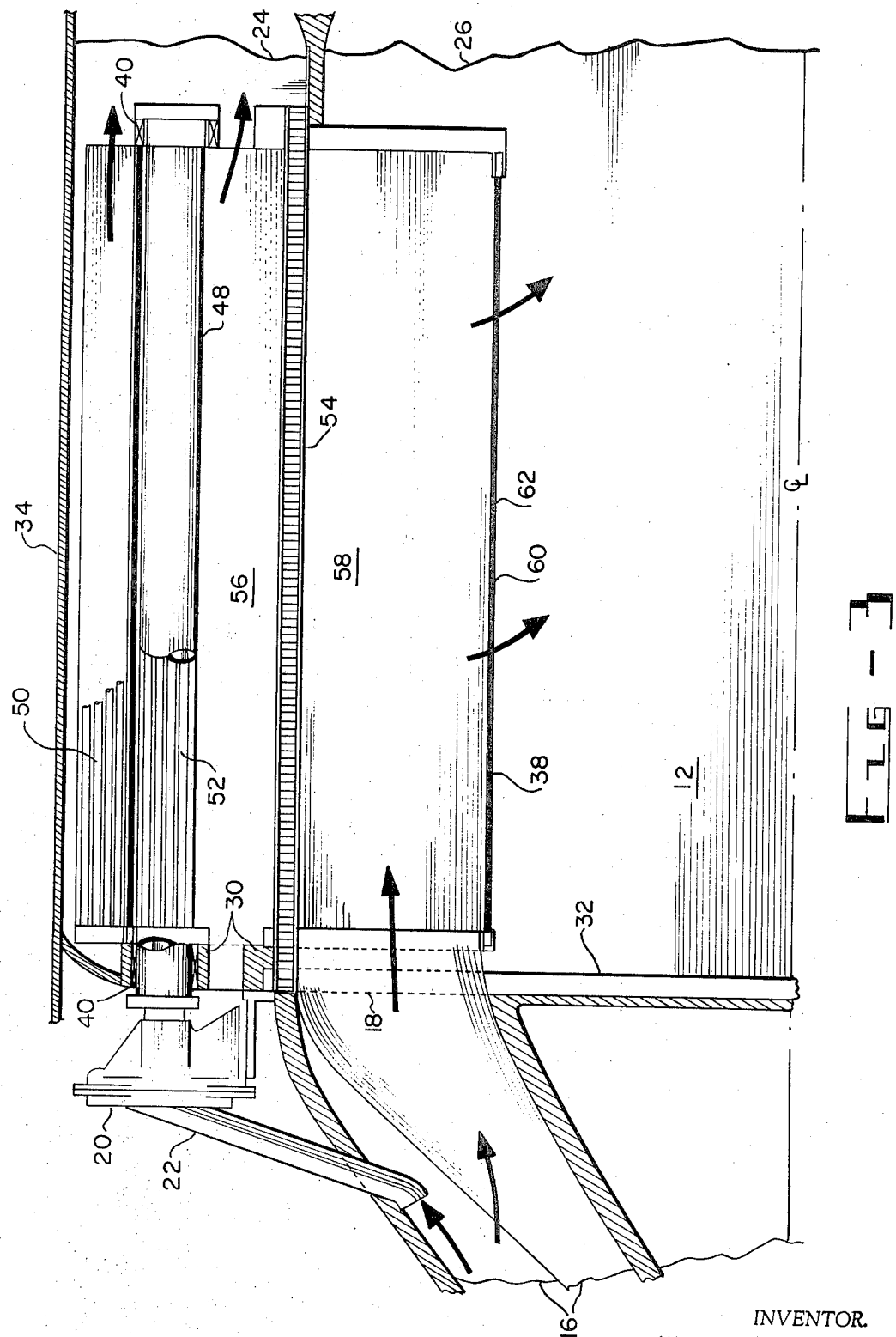

APPARATUS FOR CHEMICALLY SEPARATING OXYGEN FROM AIR

This invention relates to a chemical separator apparatus and more particularly to a rotary bed type oxygen separator for aerospace planes.

In general, the present invention relates to a rotary bed type oxygen separator wherein a plurality of cylindrical, chemical drums are supported for axial rotation within a housing, with one portion of each drum periphery being in a high pressure environment, and the other portion being in a low pressure environment. Suitable dynamic seal means within the drums and at their circumference maintain the pressure differential during operation of the separator. In operation, high pressure inlet air is admitted to an inlet area within each drum, is passed through the drum sidewall which is oxidized in the process and is discharged through a waste air outlet in the housing. Meanwhile, air to be oxygenated is admitted to a low pressure inlet area within the drum and is discharged through the sidewall of the rotating drum. Finally, the enriched air is discharged from the housing.

It is an object of the present invention to provide a separator apparatus having a cluster of cylindrical drums and wherein each drum has a high pressure chamber and a low pressure chamber.

It is another object of the present apparatus to provide a separator with an unique construction wherein a housing, an end frame and a plurality of tension rods are the basic structural components.

It is a further object of the present invention to provide a chemical separator wherein the extreme pressure loads are being facilitated by having the high pressure chamber within an inner cylindrical area and the low pressure chamber concentric with this inner cylindrical area.

It is an additional object of the present invention to provide a chemical separator construction wherein the accumulated loads, being primarily the centrifugal loads and pressure differential loads, are reacted in the frames at each end of the structure and wherein tension rods are provided at the end frames in order to react the accumulated loads in the end frames.

Furthermore, this invention provides other objects, features and advantages which will become very apparent from the following detailed description taken in conjunction with the accompanying drawings which illustrate and clarify the preferred embodiment of this device.

FIG. 1 shows a side view of the multiple drum chemical separator.

FIG. 3 shows a partial view taken from FIG. 1 along line 3—3 and illustrating a longitudinal cross section through one of the cylindrical chemical drums.

FIG. 4 shows a wall portion of the cylindrical chemical drum taken from FIG. 2 along line 4—4.

FIG. 5 shows the chemicals deposited inside of the wall portion illustrated in FIG. 4 and taken along line 5—5.

Figure 2:
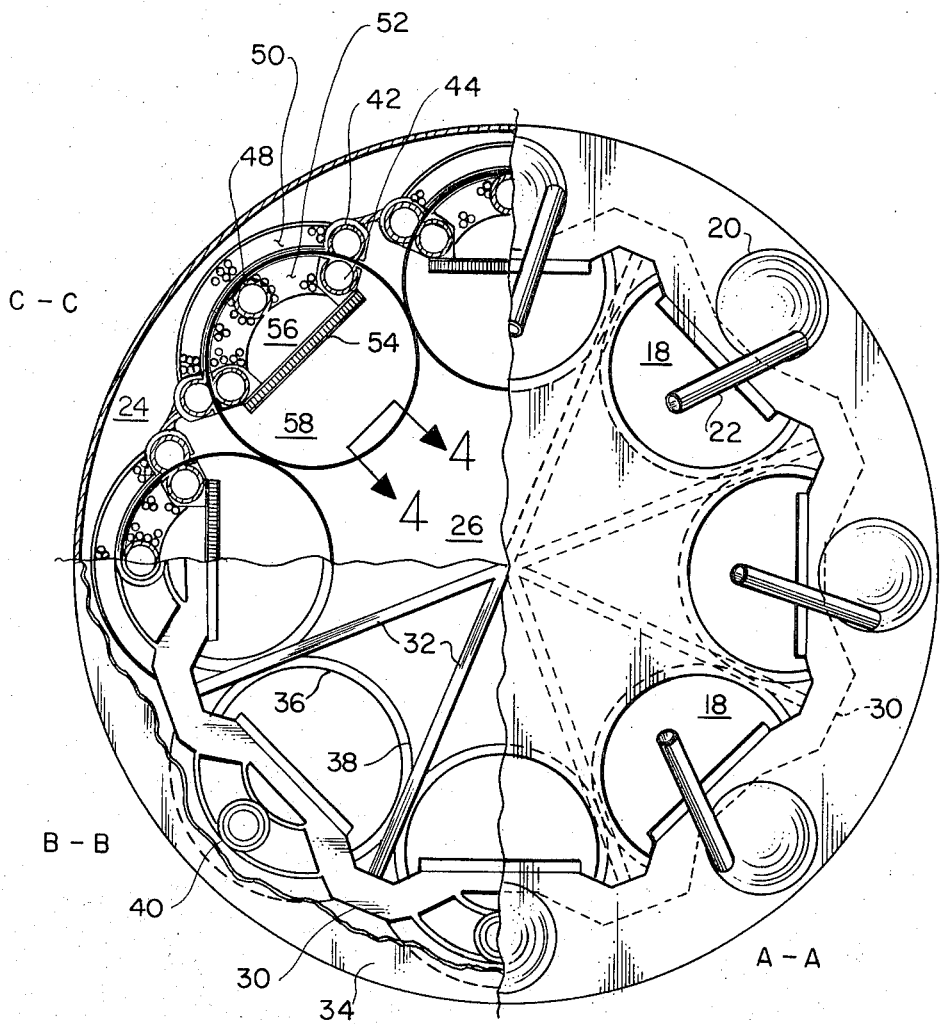
FIG. 2 shows a step-down cross section taken from the illustration shown in FIG. 1 along the lines A—A, B—B and C—C.

Referring now to the drawings wherein like reference characters designate corresponding parts throughout the figures, there is shown in FIG. 1 a side view of the multiple drum chemical separator 10 comprising a chemical drum structure 12 and a special designed air intake section 14, for furnishing a high pressure and high temperature of inlet air for the structure 12. The immediate air inlet area of the rotary bed structure 12 has an entrance bullet 16 which channels the air into a plurality of openings 18. A plurality of air turbines 20 with inlet nozzles 22 are positioned about the entrance bullet 16. An outlet duct 24 is connected beyond the rotary chemical drum structure 12, for transporting the oxygen subtracted from the air by the separator 10, to a tank or engine (not shown). A waste air outlet duct 26 is provided next to the outlet duct 24, for dumping the oxygen poor air.

In FIG. 2 is illustrated a stepped-down section view along planes A—A, B—B and C—C taken from the view illustrated in FIG. 1. The half-round plane A—A shows in particular the inlet openings 18 and the turbines 20 with the nozzles 22.

In the next plane B-B, illustrating a quarter section of the chemical drum structure 12, the end frame 30 with tension rods 32 and part of the housing 34 are shown. Drum side ring-frames 36, being part of the drum 38, are mounted adjacent between each set of tension rods 32 and frame member 30. Bearing 40 is mounted on the frame extension 30.

In the last plane C—C, illustrating a quarter section of the chemical drum structure 12, an outer seal 42 and an inner seal 44 are mounted opposite one another. The rotatable drum 38 is actuated to rotate by the drive roller 48, mounted between bearings 40 and energized by the turbine 20. An outer heat exchanger 50 and an inner heat exchanger 52 are mounted opposite one another while providing space so that the wall of the drum 38 passes inbetween outer and inner heat exchangers 50 and 52 respectively. The drum 38 is divided into two chambers by a honeycomb panel 54. The honeycomb panel 54 is mounted on the housing of seal 44 and separates the low pressure chamber 56 from the high pressure chamber 58 in each drum 38.

In FIG. 3 there is shown a side view of the drum 38 mounted for axial rotation on bearings 40 and driven by the drive roller 48 through the turbine 20. The entrance bullet 16 guides the incoming high pressure high temperature air through hole 18 into the high pressure chamber 58 of the drum 38. The oxygen is stripped from the air by the chemicals 60 which are deposited in the double wall 62 of the rotating drum 38. As a reactant, chemicals such as cobalt oxide, palladium or barium oxide are used. The oxygen poor air is then, after passing through double wall 62, transferred out of the apparatus by the waste air outlet duct 26.

FIG. 4 is a section taken through the double wall 62 from FIG. 2 along line 4—4. One side of the double wall 62 is provided with a plurality of holes or apertures 64 covered by a mesh screen 66. Screen materials used should be capable of withstanding high stresses and temperatures and materials such as Hastelloy X, ceramic or silica dioxide gauze can be used.

FIG. 5 is a section taken along line 5—5 from FIG. 4 and shows the chemicals 60 deposited in between the double wall 62. A plurality of holes 68 is also provided in the outer surface of the double wall 62 and covered with mesh screens 70. The holes 64 are offset in regard to the holes 68 so that a longer path is provided to the air for passing through the double wall 62.

Having thus provided character references to the illustrated figures the operation of the device is as follows:

Consider a closed system containing air and the reacting oxide at a given temperature. If the oxygen partial pressure is greater than the equilibrium pressure the higher oxide will be formed and the system will come to equilibrium such that the oxygen partial pressure in the air will be reduced until it reaches the equilibrium value. Simultaneously, the heat generated by the reaction results in a rise in particle temperature. If the system is now suddenly vented to the atmosphere and allowed to again reach equilibrium, the reverse reaction will occur and oxygen will be produced accompanied by a decrease in oxide temperature. Oxygen regeneration and vent cooling will continue until the bed temperature lowers to a value corresponding to an oxygen pressure of one atmosphere.

The chemical separator 10 acts on this same principle by rapidly cycling the chemical bed 60 between the high and low pressure environments or chambers 56 and 58.

Assuming that the chemical separator as shown in FIG. 1 is mounted on an aerospace plane flying at a certain speed, the collected air in the inlet area 14 is compressed to approximately 1,200 p.s.i. and an associated temperature of 1,700° – 2,000°Rankin.

As shown in FIG. 2, plane A—A, the air is then guided through the inlet bullet 16 into holes 18 and nozzles 22. In FIG. 3 the inlet air received by nozzle 22 will provide the energy to the turbine 20 for rotating roller 48 which in turn rotates the drum 38 at a speed of approximately 2,500 rpm.

After passing hole 18, the high pressure inlet air is received in the high pressure chamber 58 and passes through the perforated wall 60 into the waste outlet duct 26. During the passing of the air through the double wall 62, the material in the chemical bed 60 becomes oxidized by stripping the air from its oxide. However, the rotating drum passes the oxidized chemical bed 60 from the high pressure chamber 58 to the reduced pressure chamber 56, wherein the reaction reverses and the oxygen is expelled from the chemical bed 60 into the area 56. The low pressure causes primarily this reversed reaction. The heat exchangers cool the collected oxygen and causes liquification or, i.e., reduces storage volume. The oxygen thus provided in the low pressure area 56 is ducted from the separator 10 through the outlet duct 24 to storage tanks or engines (not shown).

In considering the high temperatures of up to 2,000°Rankin and high rotating speeds up to 3,000 rpm of the chemical bed, as well as the high pressure drop from the high pressure area 58 to the low pressure area 56 of approximately 17 atmospheres, it is essential that super alloys of material as well as a solid structure should be provided.

Therefore, existing chemical separators are made of heavy material and have a bulky structure. Their large size and heavy weight make them inefficient for airplane use.

The present invention discloses a multiple drum chemical separator 10 which is specifically designed for aerospace use and which design concept takes into account the reduction of weight, the maximum volume of the separator 10 and the size of the separator structure 12 while maintaining a great drum angular velocity.

Long structural beams have been omitted because the housing 30 reacts to a uniform internal pressure so that longitudinal structural means are not necessary. By removing this limitation the weight of this apparatus is approximately 40 percent less than existing separators. The materials selected for the construction of the separator 10 are super alloys capable of withstanding high temperatures and stresses, such as Rene 41.

Each drum 38 rotates for cycling the chemicals from one pressure agent to another and back again. The upper limit of the speed of this rotation was established by centrifugal stress and bearing limitations. Speeds from approximately 3,000 to 4,000 rpm were established.

The required strength of the drum structure was determined from the following analysis. In the oxidation section, hoop stresses are imposed on the drum structure by the pressure drop of the air flowing through the drum 38, and by the centrifugal force developed from the rotating masses. Also additional stresses are developed in the structure by the seal rollers 42 and 44 used to react the resultant force of the pressure drop on the drum 38. These seal rollers imparted a bending moment to the drum surface. However, these bending stresses are reduced by the centrifugal force which tends to maintain the circular shape of the drum.

Isolating a section of the drum 38 between two seal rollers and treating the drum as a fixed curved beam with a uniform load (centrifugal force), a deflection of the beam exists, however, from a comparison of the deflections, which are opposite in direction, it becomes obvious that there is no deflection due to the bending moment and therefore no bending stress.

The primary load on the remaining structure results from the pressure difference between the oxidation and reduction regions. Honeycomb panels are utilized as the primary divider between the regions. The panels are designed to remain rigid under the pressure difference.

The accumulated loads are reacted in the end frames 30 at each end and the roller housings which provide support along the length of the panels 54. Tension rods 32, then, react the load accumulated in the end frame 30. FIGS. 2 and 3 illustrate the preferred structural arrangement.

Air turbines 20 produce the horsepower to drive the rotating drum 38. Inlet air taken from the main air flow is ducted into each turbine 20 and expanded. Analysis indicates that 50 horsepower turbines are more than conservative.

One turbine of the type pictured in FIG. 3, produces enough horsepower to rotate all of the drums 38, but the gear box required to link the drive shafts would weigh many times the weight of the turbines 20 shown. Therefore it was decided to use one turbine for each drum 38. Of course, the speed of each turbine drive shaft has to be controlled, so a weight allowance is established for controls.

Having thus described this invention, it will be obvious that various other structural changes and modifications may be contemplated by those skilled in the art without departing from the invention and it is intended to cover in the appended claims all such changes and modifications as come within the true spirit and scope of the invention.

I claim:

1. A chemical separator for use in aerospace planes for the collection of oxygen from the air, comprising in combination:
   a. a housing provided with an air inlet and air outlet section,
   b. a plurality of cylindrical drums supported for axial rotation parallel with said housing longitudinal center axis each of said drums provided with porous walls carrying a chemical for collecting oxygen from air passing therethrough,
   c. said housing having mounted at each end a substantially ring-shaped end frame with a plurality of tension rods connected thereon in spoke type fashion, and
   d. each said tension rods connected with one another at a center point connection coincident with said housing center axis.

2. A chemical separator for use in aerospace planes for the collection of oxygen from the air, comprising in combination:
   a. an elongated cylindrical housing provided with an air inlet on one end and air outlet section on the other end,
   b. a plurality of cylindrical drums supported within said housing for axial rotation along their longitudinal axis parallel with respect to said housing longitudinal center axis,
   c. each of said drums provided with porous walls carrying a chemical for collecting oxygen from air passing therethrough,
   d. drive means mounted on said housing for rotating said plurality of drums,
   e. sealing means mounted in combination with a divider panel within said housing for providing a low and a high pressure area in said drums,
   f. said housing comprising at each of said ends a ring-shaped end frame, concentric with said housing periphery, having a plurality of tension rods mounted thereon, and
   g. each said tension rods having a first end and a second end and connected with said first end on said end frame at equal spaced locations and said second end mounted with said second ends of each said other tension rods forming a center point connection coincidental with said housing center axis.

3. A structure for chemical separators for use in aerospace planes for collecting oxygen from the air for power plant usage, comprising in combination:
   a. a cylindrical housing having mounted, at each end, a ring-shaped frame member perpendicular and concentric with said housing periphery,
   b. a plurality of tension rods mounted with one end, in spoke type fashion, within said ring-shaped frame member and with the other end of said tension rods connected at a point coincident with said housing longitudinal center axis,
   c. a plurality of drums mounted parallel within said housing for rotation along said drums longitudinal axis and said plurality of drums concentrically clustered with respect to said housing each of said drums provided with porous walls carrying a chemical for collecting oxygen from air passing therethrough,
   d. each of said drums inside volume being divided by a panel mounted on said housing and said panel separating a high and a low pressure area so that said housing has a high pressure area within its inner cylindrical area and a low pressure area concentric with said cylindrical area, and
   e. said housing transmitting centrifugal loads of said rotating drums and pressure differential loads of said high and low pressure areas into said ring frame member for reaction thereof by said tension rods.

4. A chemical separator structure for use in aerospace planes for the collection of oxygen from the air comprising in combination:
   a. an elongated cylindrical housing provided with an air passage section on each end of said housing,
   b. a plurality of drums mounted parallel within said housing for rotation along said drums longitudinal axis and said plurality of drums concentrically clustered with respect to said housing,
   c. each said drum provided with porous walls carrying a chemical for collecting oxygen from the passing air,
   d. drive means mounted on said housing and connected to said drums for activating rotation thereof,
   e. sealing means mounted, in combination with a divider panel, within said housing for providing a low and a high pressure area in each of said drums,
   f. said housing having at each said ends substantially continuously round-shaped open end frames, mounted perpendicular and concentric with said elongated housing, and
   g. a plurality of tension rods mounted in spoke-like fashion, with their first end at equal space locations about said open end frame and connected together with their second ends so that said second ends form a connection coincidental with said housing central longitudinal axis and wherein said tension rods are reacting the centrifugal loads of said rotating drums and said pressure differential loads of said high and low pressure areas through said frame member via said cylindrical housing.

5. A chemical separator structure for use in aerospace planes for the collection of oxygen from the air comprising in combination:
   a. a housing means of cylindrical configuration with mounted end frame means having each a ring-shaped structure with tension rods arranged in spoke type fashion,
   b. a means mounted within said housing means for collecting oxygen from air passing through said housing means,
   c. said oxygen collecting means containing a rotational mass and a structure for separating a high and a low pressure area, and
   d. said housing means and said end frame means arranged for transmitting pressure differential loads of said high and low pressure areas and centrifugal loads of said rotational mass to be carried by said tension rods.

6. The chemical separator structure as claimed in claim 5 wherein said rotational mass of said oxygen collecting means comprises a plurality of chemical-filled double wall drums mounted for rotation with the drums longitudinal axis arranged in a concentric circle parallel to said housing means longitudinal axis within said housing means.

7. The chemical separator structure as claimed in claim 5 wherein said structure for separating a high and a low pressure area comprises a plurality of panels arranged in a concentric circle within said housing for dividing said rotational mass to a high and low pressure area and mounted with seal means on said inside housing means.

8. A chemical separator structure for use in aerospace planes for the collection of oxygen from the air comprising in combination:
   a. a circular housing having concentrically mounted thereon on each end a ring-shaped frame member with tension rods arranged in spoke type fashion and mounted on said frame member for carrying loads received in said circular housing,
   b. oxygen collecting means having a plurality of chemical-filled double wall drums rotationally mounted on bearing means mounted in said housing,
   c. drive means connected to said drums for activating rotation of said drums,
   d. said oxygen collecting means having a plurality of panels with seal means wherein said panels are mounted stationary between said frame means at each end of said housing and each said panels dividing each said drums into a low pressure area and a high pressure area whereby said seal means provide sealing against said drum walls, and
   e. said high pressure areas in said drums located at said housings longitudinal center axis side so that pressure differential loads are together with centrifugal loads of said rotating drums absorbed in said housing, said frame members and said rods.

* * * * *